United States Patent [19]

Akiyama

[11] Patent Number: 6,038,249
[45] Date of Patent: Mar. 14, 2000

[54] SPECTRUM SPREAD TRANSMISSION METHOD AND APPARATUS

[75] Inventor: Toshiyuki Akiyama, Tokorozawa, Japan

[73] Assignee: Hitachi Denshi Kabushiki Kaisha, Tokyo, Japan

[21] Appl. No.: 08/819,088

[22] Filed: Mar. 18, 1997

[30] Foreign Application Priority Data

Mar. 19, 1996 [JP] Japan ................................. 8-063369

[51] Int. Cl.[7] .............................. H04B 15/00; H04K 1/00; H04L 27/30
[52] U.S. Cl. ........................................................ 375/206
[58] Field of Search ................................. 375/200, 206, 375/208, 282, 281, 333, 261, 279–280; 370/342, 335; 380/34; 329/304; 332/103

[56] References Cited

U.S. PATENT DOCUMENTS

| | | | |
|---|---|---|---|
| 4,918,706 | 4/1990 | Phillips et al. ........................... | 375/200 |
| 4,984,247 | 1/1991 | Kaufmann et al. ...................... | 375/200 |
| 5,280,537 | 1/1994 | Sugiyama et al. ....................... | 375/200 |
| 5,313,457 | 5/1994 | Hostetter et al. ........................ | 375/200 |
| 5,353,302 | 10/1994 | Bi ............................................ | 375/200 |
| 5,450,395 | 9/1995 | Hostetter et al. ......................... | 370/18 |
| 5,577,025 | 11/1996 | Skinner et al. ........................... | 370/22 |
| 5,720,039 | 2/1998 | Lieberman ................................ | 455/10 |

Primary Examiner—Chi H. Pham
Assistant Examiner—Jean B Corrielus
Attorney, Agent, or Firm—Antonelli, Terry, Stout & Kraus, LLP

[57] ABSTRACT

Transmission method and apparatus allow two channel simultaneous transmission of information codes having a transmission rate of 1.5 Mbps necessary for the transmission of motion pictures or semi-motion pictures through a 2.4 GHz small power communication band (ISM band). Carrier frequencies $f_{fa}$ and $f_{hb}$ of the two channels are set to different values from each other, QPSK modulation is demodulated in a receiver and then inverse-spread of the spectrum spread is conducted, and a low pass filter having a root roll-off characteristic is inserted to a succeeding stage of a spectrum spread circuit of a transmitter and a preceding stage of the spectrum inverse-spread circuit of the receiver.

3 Claims, 12 Drawing Sheets

SPECTRUM SPREAD TRANSMISSION METHOD AND APPARATUS

BACKGROUND OF THE INVENTION

The present invention relates to a spectrum spread transmission, and more particularly to spectrum spread transmission method and apparatus which allow simultaneous reception of a plurality of channels of information codes at close positions even when spread codes (PN codes or Pseudo Random Noise codes) having a short code length are used.

FIG. 10 shows a circuit configuration of a transmitter of a prior art transmission apparatus of a spectrum spread system and FIG. 11 shows a circuit configuration of a receiver.

Those circuit configurations are for a transmission apparatus which uses both a delayed detection binary phase shift keying modulation (DBPSK) system and a spectrum spread (SS) system.

A delayed code processing unit 2 converts an information code to be transmitted into a code sequence suitable for the delayed detection. An SS spread unit 3 conducts direct spread modulation of the spectrum spread system, a PN code generator 4 generates a spread code (PN code) to be used in the direct spread modulation and a PN clock generator 5 generates a clock pulse for defining a bit frequency $f_{pn}$ of the PN code. Hereinafter, for simplicity, the frequency $f_{pn}$ is referred to as a chip rate or a chip frequency.

The information code inputted from an input terminal 1 of the transmitter is code-converted by the delayed code processing unit 2, product-modulated by the spread code from the PN code generator 4 by the SS spread unit 3, and converted to a base band spread signal.

An LPF 6 is a low pass filter (LPF) having characteristics 11 diagrammatically shown in FIG. 12 by a chain line and it extracts a main robe 12 (shown by solid thick line) of a primary component from frequency characteristic components (shown by solid line) of the spread signal.

The main robe component of the spread signal extracted by the LPF 6 is modulated into a binary phase shift keying (BPSK) signal having a carrier frequency $f_h$ by the modulator 7 and it is transmitted from an antenna 8 as a transmission signal.

On the other hand, in the receiver of FIG. 11, a received signal from an antenna 20 is inputted to a BPF 21. The BPF 21 is band pass filter (BPF) which passes components having a band width of $2 \times f_{pn}$ centered at the carrier frequency of $f_h$ and it extracts the main robe component of the transmitted modulated signal.

The extracted main robe signal is inverse-spread by multiplying the PN code by an SS inverse-spread unit 22, demodulated to a base band by a demodulator 23 of the BPSK system and converted to a digital signal by an A/D converter 24.

A process for the delayed detection is conducted by a delayed detection processing unit 25 which outputs it as an information code. The PN code generator 26 and the PN clock generator 27 have the same functions as those of the PN code generator 4 and the PN clock generator 5 of the transmitter.

For the PN code, it is necessary to use a code having a large difference between in-phase and out auto-correlation values. As a code having such a property, an m-channel pseudo noise code or Gold code having the number of repetition bits (hereinafter referred to as a chip length) represented by $2^k-1$ (where k is a positive number) has been known, and this code is usually used as the PN code.

The SS system has two major features. One is that a large spread process gain is attainable. For example, when a PN code having a chip length of 255 chips, a spread process gain of $10 \times \log(255) = 24$ dB is attained.

This means that a transmission distance can be extended by ten times or more (which is comparable to a performance when a C/N of the received signal is increased by 24 dB) to compare with the transmission by only the DBPSK system. The larger the chip length of the PN code, the larger the spread process gain.

Thus, the PN code having as long a chip length as possible is usually used within a range permitted by the transmission band width and the transmission rate. C represents a carrier and N represents a noise.

The second feature is that one transmission band may be shared by a plurality of channels as diagrammatically shown in FIG. 13A. In the SS system, a signal of another channel which uses a different PN code is introduced into the received signal as a random noise, and it merely lowers the C/N of the received signal but does not disturb the SS inverse-spread process of that channel. Thus, in the transmitter of the SS system, a plurality of different PN codes having a small mutual correlation are usually used and the simultaneous transmission of the plurality of channels is conducted while compensating the reduction of the C/N by the spread process gain.

In the transmitter which uses such an SS system, a frequency band which is so-called ISM band (Industrial, Scientific and Medical Band) having a band width of 26 MHz from 2471 to 2497 MHz is allocated. The chip rate $f_{pn}$ of the PN code used in this band is usually set to not higher than 26 MHz/2=13 Mcps to permit the transmission of the main robe of the spread signal.

As a prior art wireless transmitter which uses the ISM band, a wireless LAN having a transmission rate of 256 Kbps has been known. While a detailed specification of the wireless LAN is not known because it has not been laid open, it is generally considered as follows according to a view of the inventors of the present invention. In this wireless LAN, a maximum usable chip length of the PN code is 13 Mcps/256 Kbps=50 chips. However, the 50-chip code which may be used as the PN code has not been publicly known. It may be possible to search by using a computer but it is not practical because the chip length is too long and the calculation amount is extremely large.

Accordingly, it appears that in this wireless LAN, the 31-chip channel code which is the channel code of the maximum usable chip length is used as the PN code.

Accordingly, the chip rate is 256 Kbps×31 chips=8 Mcps and the band width of the main robe of the transmission signal is double of that, that is, 16 MHz.

This value is smaller than the band width of 26 MHz of the ISM band. On the other hand, the code of the 31 chips or smaller number of chips has a small mutual correlation and includes a small number of highly independent codes. For example, for the 31-chip m-channel code, the number types of codes is only three. Thus, it appears that by providing two channels having different carrier frequencies (to allow the use of the same PN code in the respective channels) while utilizing a margin for the band width, the number of channels which may be simultaneously used is doubled.

In a system for preventing disasters or a monitoring apparatus, there is a strong demand for a wireless transmission apparatus which allows the transmission of motion pictures or semi-motion pictures and which does not need application or procedures for permission by the authorities. Further, as shown in FIG. 14, there is a strong demand for simultaneously receiving motion pictures or semi-motion pictures of two or more channels from two different points (usually, a plurality of points) at a center (base station).

A frequency band which can satisfy the first demand is the ISM band. On the other hand, in order to transmit the motion pictures, the transmission rate of at least four times of 256 Kbps or 1 Mbps, preferably 1.5 Mbps or larger is required even if the modern image compression technique is fully used. Further, a code error rate of at most one error per minute (the code error rate is not larger than $1/10^8$ for 1.5 Mbps) is required.

In the ISM band, it is obliged by the Radio Regulatory Law to use PN code having a chip length of not less than ten chips. Thus, in the SS system transmitter using the DBPSK, the transmission from 1 Mbps to 1.3 Mbps=13 Mcps/10 chips is permitted but the information code of 1.5 Mbps which is beyond the above limit cannot be transmitted. In order to transmit the information code having the transmission rate of 1.3 Mbps, it is necessary to replace the modulator 7 of FIG. 10 and the demodulator 23 of FIG. 11 from the binary phase shift keying (BPSK) system to the quadrature phase shift keying (QPSK) system to increase the transmission rate.

Circuit configurations modified to the QPSK system are shown in FIGS. 15 and 16. Those circuits are devised by the inventors of the present invention. In the QPSK system, an input information code is separated into two components I and Q, which are modulated by a sine wave and a cosine wave of a carrier for transmission.

An SS spread unit 3 of FIG. 15 ss-spreads the I and Q components and it is different from the spread unit 3 of FIG. 1 in the internal circuit configuration. However, both function in the same way except that the same process as the SS spread in the BPSK is applied to the two components I and Q. Thus, the same reference numerals are used for the components of the circuit and the SS spread unit of FIG. 15 is designated by the SS spread unit 3.

LPF 6I and LPF 6Q of FIG. 15 are low pass filters which apply the same process as that of the LPF 6 of FIG. 10 to the I and Q components. For simplicity, in the description of FIG. 15, LPF 6 designated both the LPF 6I and the LPF 6Q.

In other circuits of FIGS. 15 and 16, those circuits which function in the same way as those FIGS. 10 and 11 are designated by the same numerals. The operations of the respective circuits are identical to those of FIGS. 10 and 11 except the above points.

When the information of 1.5 Mbps is transmitted by the transmitter replaced by the delayed detection quadrature phase shift keying (DQPSK) system, the usable chip length of the PN code is not larger than 13 Mcps/1.5 Mbps×2 phases=17 chips.

For the 17-chip length, unlike the 50-chip length described above, the search by the computer may be possible because the chip length is short, but when the 15-chip PN code which is the maximum usable channel code is used as it is used for the wireless LAN, the chip rate is 1.5 Mbps×15 chips/2 phases=11.25 Mcps.

The band width of the main robe of the transmission signal is double of that, that is, 22.5 MHz<26 MHz.

When two channels of information codes of motion pictures or semi-motion pictures are simultaneously received at the center in accordance with the second demand described above, it is necessary to make the reception levels of the two channels equal in order to obtain the images of the same image quality for the two channels.

However, when the conventional bandwidth utilization scheme as shown in FIG. 13A is used, the C/N is as low as 0 dB. Moreover, with the conditions above, the margin for the band width of 26 MHz of the transmission band is as narrow as 3.5 MHz (=26 MHz–22.5 MHz). For this reason, even if the main robes of the two channels are separated fully across the opposite sides of the transmission band B as shown in FIG. 13 B, the main robes of the two channels have a large overlap as shown in FIG. 13B, thereby reducing the C/N in simultaneous transmission of the two channels as almost equal to that in FIG. 13A. In order to attain an error rate no larger than approximately $1/10^8$ solely by the DQPSK system, the received signal having the C/N of no less than approximately 17 dB is theoretically needed. Accordingly, in order to simultaneously receive the signals of the two channels of 1.5 Mbps, a spread process gain of at least 17 dB is needed to fill the difference between the C/Ns. However, with the 15-chip length, a spread process gain of only approximately 12 dB is attained and the simultaneous transmission of the two channels of 1.5 Mbps by the second demand is not attained.

SUMMARY OF THE INVENTION

It is an object of the present invention to provide spectrum spread system transmission method and apparatus which allow simultaneous reception of motion pictures or semi-motion pictures at a center to meet the second demand.

In order to achieve the above object, a spectrum spread system transmission apparatus in a binary phase shift keying (BPSK) system or a quadrature phase shift keying (QPSK) system and a spectrum spread system by direct spread modulation, in accordance with a first feature of the present invention:

(1) uses a spread code (PN code) having a chip length less than a maximum length of channel code permitted by a bandwidth of a predetermined transmission band and a predetermined transmission rate, (2) two or more channels are provided, and (3) carrier frequencies $f_{ha}$, $f_{hb}$, . . . of the respective channels are set to different values from each other.

Preferably, a spread code having a chip length L which meets $$2^{kmax}-1 > L$$

where kmax is a maximum number which meets $(B/2)/D > 2^k-1$, B is the predetermined transmission band and D is the predetermined transmission rate,
is used in the BPSK system as the spread code having the chip length smaller than the longest channel code.

Preferably, a spread code having a chip length L which meets $$2^{kmax}-1 > L$$

where kmax is a maximum number which meets $(B/2)/(D/2) > 2^k-1$, B is the predetermined transmission band and D is the predetermined transmission rate,
is used in the QPSK system as the spread code having the chip length smaller than the longest channel code.

For example, for the two-channel transmission of 1.5 Mbps, the channel code of the longest chip length of 15 chips (the chip rate at this time is denoted as $f_{pn}$) is changed to the PN code of shorter, 10-chip length (the chip rate at this time is denoted as $f'_{pna}$ which is shorter than $f_{pn}$).

Namely, the bandwidth of the main robe is set to 1.5 Mbps×10 chips/2 phases×2=15 MHz<26 MHz which is shorter than the bandwidth of 22.5 MHz when the 15-chip code is used. The resulting margin band of 11 MHz is used to separate the band positions of the main robes of the two channels fully across the opposite sides of the ISM band as shown in FIG. 13C to reduce the interference component 13 of other channel. Note that in FIG. 13C the broken lines show main robes when 15-chip PN code is used as in the case of FIG. 13B.

More specifically, for the two channel transmission of 1.5 Mbps, the channel code of the longest chip length of 1.5 chips is changed to the PN code of ten chips and the chip rate is set to 1.5 Mbps×10 chips/2 phases=7.5 Mcps.

Further, the carrier frequencies $f_{ha}$ and $f_{hb}$ of the two channels are set to $f_{ha}$=(2484−5.5) MHz, $f_{hb}$=(2484+5.5) MHz so that the band positions of the main robes of the respective channels are separated fully across the upper and lower ends of the ISM band (2471–2497 MHz, center frequency 2484 MHz).

With this setting, the carrier frequencies of the two channels are separated from each other by 11 MHz. As shown in the frequency distribution of FIG. 13C, by separating the carrier frequencies of the two channels, the same PN code may be used in the two channels and, in addition, the interference component 13 from other channel is reduced and the C/N of the received signal in the simultaneous reception may be improved.

When the prior art channel code of the longest length of 15 chips is used, the chip rate is as high as 11.3 Mbps as shown in the frequency distribution of FIG. 13B, and even if the main robes are separated as much as possible, the carrier frequencies are $f_{ha}'$=(2484−1.75) MHz, $f_{hb}'$=(2484+1.75) MHz. Thus, the separation width of the carrier frequencies of the two channels is only 3.5 MHz and the C/N of the received signals is improved from 0 dB to only approximately 0.5 dB.

On the other hand, the separation width in the present invention is as large as 11 MHz and the interference component 13 of other channel is significantly reduced and the C/N of the received signal is improved to approximately 10.5 dB.

Thus, the shortage of the C/N necessary for the simultaneous reception of the signals of the two channels of 1.5 Mbps is significantly reduced from 17 dB or more to 6.5 dB or more. This value is smaller than the spread process gain of the ten chips=10×log(10)=10 dB and the difference between C/Ns can be fully filled. Thus, the simultaneous transmission of the two channels of 1.5 Mbps is attained.

The transmission system in accordance with the second feature of the present invention not only allows the simultaneous transmission of the two channels of 1.5 Mbps but also improves the problem encountered in the level adjustment to be described later which remains unresolved by using the transmission system in accordance with the first feature and the maximum transmission distance can be extended longer than that attainable by the transmission system of the first feature.

Namely, in a spectrum spread system transmission apparatus for transmitting the digital information by spectrum spread-encoding it and receiving the spread signal and inverse-spread-encoding it to produce original digital information the following results, (1) two or more channels are provided, (2) carrier frequencies $f_{ha}$, $f_{hb}$, . . . of the respective channels are set to different values from each other, (3) in a receiver of the transmission apparatus, the binary phase shift keying (BPSK) or quadrature phase shift keying (QPSK) of the received transmission signal is demodulated to produce a base band signal, and the demodulation (SS inverse-spread) of the SS modulation (SS spread) is conducted for the demodulated base band signal, and (4) a frequency characteristic control means (circuit) for limiting the band of the spread signal to a range narrower than a main robe band determined by a bit frequency $f_{pnj}$ (chip rate) of the spread signal (PN signal) of the channel J (J represents channel A or B) is inserted at least one of between the SS spread circuit for the channel J and the transmitting antenna or between the receiving antenna and the SS inverse-spread circuit.

The transmission system in accordance with a third feature of the present invention relates to the circuit configuration for implementing the transmission system in accordance with the second feature. Namely, the transmission system in accordance with the third feature of the present invention is characterized in the transmission system in accordance with the second feature of the present invention, by that:

(1) a root roll-off filter corresponding to the chip rate $f_{pnj}$ of the channel J for limiting the band to a range narrower than a main robe band determined by the bit frequency $f_{pnj}$ (chip rate) of the spread code (PN code) of the channel J is provided between the SS spread circuit for the channel J and the transmitting antenna; and (2) a root roll-off filter corresponding to the chip rate $f_{pnj}$ of the channel J for limiting the band to a range narrower than a main robe band determined by the chip rate $f_{pnj}$ of the PN code of the channel J is provided between the receiving antenna of the channel J and the SS inverse-spread circuit.

The transmission system in accordance with a fourth feature of the present invention is characterized in the transmission system in accordance with the second feature of the present invention, by that:

(1) a root roll-off filter corresponding to the chip rate $f_{pnj}$ of the channel J for limiting the band to a range narrower than a main robe band determined by the bit frequency $f_{pnj}$ (chip rate) of the spread code (PN code) of the channel J is provided between the SS spread circuit for the channel J and the transmitting antenna; and (2) the filter for limiting the band to a range narrower than the main robe band determined by the chip rate $f_{pnj}$ of the PN code of the channel J provided between the receiving antenna of the channel J and the SS inverse-spread circuit is implemented by a two-tap filter (first filter) for summing the demodulated base band signal and a signal delayed from the base band signal by one half period (T/2) of a pulse period T (1/$f_{pnj}$) of the PN signal and a low pass filter (second filter) for eliminating frequency components having frequencies not less than $f_{pnj}$ of the PN code in the base band signal.

The transmission system in accordance with a fifth feature of the present invention is characterized in the transmission system in accordance with the second feature of the present invention, by that:

a root roll-off filter corresponding to the chip rate $f_{pnj}$ of the channel J for limiting the band to a range narrower than a main robe band determined by the bit frequency $f_{pnj}$ (chip rate) of the spread code (PN code) of the channel J is provided between the receiving antenna of the channel J and the SS inverse-spread circuit.

With the transmission system in accordance with the present invention, the following problem still remains unresolved. This problem is explained with reference to FIG. 17. FIG. 17 shows a relation between a maximum transmission distance and a transmission rate, with a chip length of the PN code being used as a parameter, in the simultaneous transmission of the two channels by using the transmission system in accordance with the first feature, making it a condition that the code error rate of $1/10^8$ be obtained. The maximum distance is indicated by using the maximum transmission distance in the one-channel transmission by using the 13-chip PN code as a reference distance 1.0. In FIG. 17 the transmission distance decreases with any increase of the transmission rate. The reason therefor will now be explained. When the transmission rate is increased, the width of the main robe of each channel, which is proportional to (tap length)×(transmission rate) is reduced, which in turn increases the overlap 13 of the main robes shown in FIG. 13C, to thereby decrease the C/N of the received signal. As a result, the noise margin for the loss of distance also is correspondingly reduced, making long distance transmission difficult.

As seen from FIG. 17, by using the 10-chip PN code, the transmission distance for transmission on only one channel becomes shorter than when using the 13-chip spread code. However, the two channel simultaneous transmission of the information code of 1.5 Mbps is attained, which is impossible to attain with the use of 13-chip spread code. A broken line in the figure shows the maximum transmission distance when only one channel is transmitted.

In the two channel simultaneous transmission, it is necessary to adjust transmission powers such that the transmission signal levels of the two channels are substantially equal at a receiving point in FIG. 14. In the position setting of a movable station and the initial adjustment, the transmission is first made by one channel at a time to adjust the transmission power, and then the two channel simultaneous transmission is started. If there is a large difference between maximum transmission distances for the one channel transmission and the two channel transmission as shown by a 1.5 Mbps point of FIG. 17, it may happen that the transmission by one channel at a time is allowed but the two channel simultaneous transmission is not allowed. Thus, the adjustment of the transmission powers and the adjustment of the transmission distances link in a complicated manner and the determination of the setting position of the movable station and the initial adjustment of the transmission power are complicated.

The difference between the maximum transmission distances for the one channel transmission and the two channel transmission means that the affect of the interference of another channel is close to the limit of the processing ability of the spread process gain. Thus, if the movable station of other channel changes the position or changes the output level, the maximum transmission distance and the code error rate are significantly varied and the setting and operation method of the transmitter is complicated and inconvenient.

It is required that the transmission distance is as long as possible but since the PN code of the chip length which is shorter than that permitted by the transmission band width is used, the maximum transmission distance is shorter not only for the two channel simultaneous transmission but also for the continuous one channel transmission.

In order to improve above problems and defects, it is necessary to reduce the difference between maximum transmission distances for the one channel transmission and the two channel simultaneous transmission for the level adjustment, and allow the use of the PN code of a longer chip length in order to extend the maximum transmission distance.

The transmission system in accordance with the second feature of the present invention provides a method for improving or solving the problems remaining unresolved by the transmission system of the first feature. A characteristic attained by applying the transmission system in accordance with the third feature to the transmission system in accordance with the second feature is shown in FIG. 18. A solid line in FIG. 18 shows a relation between the maximum transmission distance and the transmission rate (calculated under the same condition as that of FIG. 17) when the transmission system in accordance with the third feature of the present invention is used. A chain line shows the characteristic shown in FIG. 17.

As seen from FIG. 18, the maximum transmission distance in the one channel transmission by using the 10-chip PN code and the maximum transmission distance in the two channel simultaneous transmission substantially overlap and the difference therebetween is significantly improved. Thus, in the position setting of the movable station and the initial adjustment, the complicated linkage of the adjustment of the transmission power and the adjustment of the transmission distance and the resulting complicated work of the determination of the setting position of the movable station and the initial setting of the transmission power are avoided and the transmitter which is easy to use is provided.

Even when the 13-chip PN code which can extend the maximum transmission distance (in the transmission system in accordance with the first feature, the information code of 1.5 Mbps cannot be transmitted) is used, the difference between maximum transmission distances for the one channel transmission and the two channel simultaneous transmission is small and the transmitter which is relatively easy for initial setting and convenient for use is provided. In this case, since the chip length is increased from 10 chips to 13 chips, the maximum transmission distance is further extended, to an advantage.

When the transmission system in accordance with the second feature of the present invention is implemented by using the transmission system in accordance with the fourth feature of the present invention or the transmission system in accordance with the fifth feature of the present invention, the same effect may be attained although the degree of improvement is somewhat less than that by the transmission system in accordance with the third feature of the present invention. Those systems will be discussed in detail in connection with the embodiments.

DESCRIPTION OF THE PREFERRED EMBODIMENTS

Figure 1:
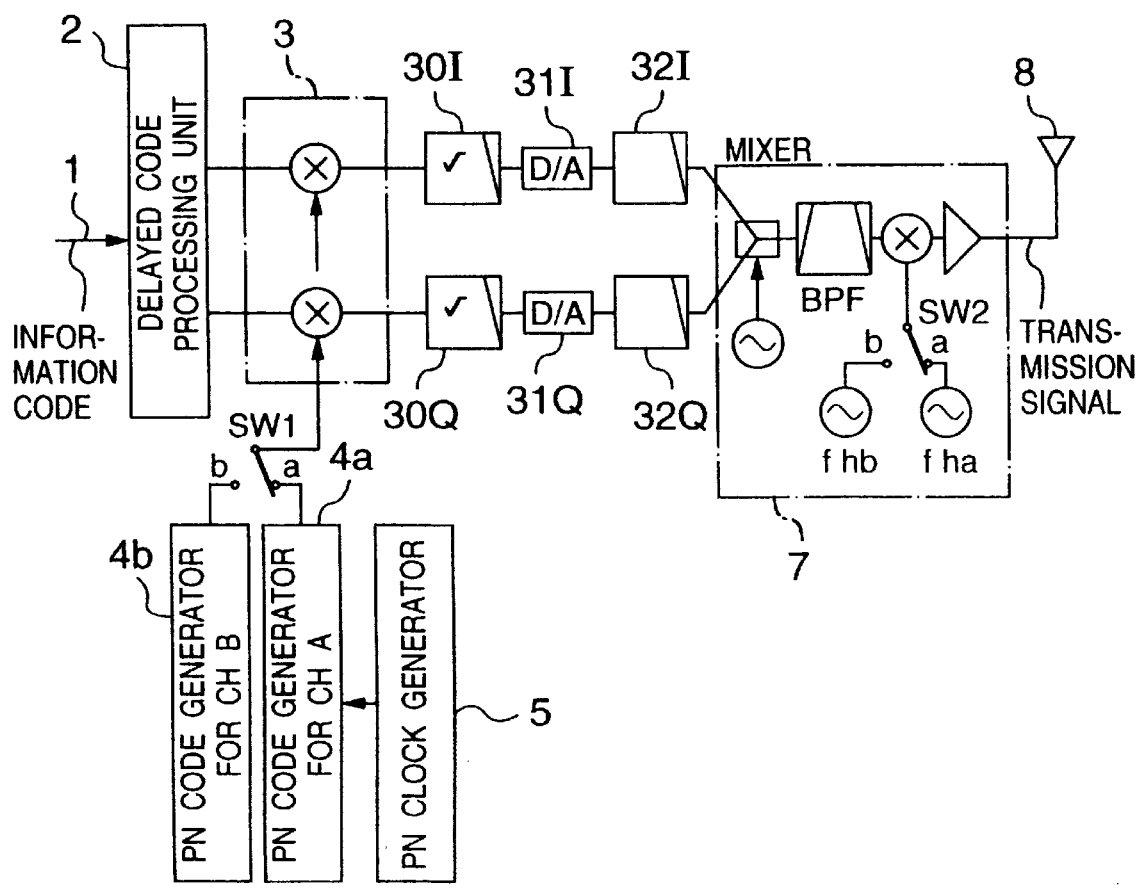
FIG. 1 shows a block diagram of a configuration of a transmitter in a transmission apparatus in accordance with a first embodiment of the present invention.
Figure 2:
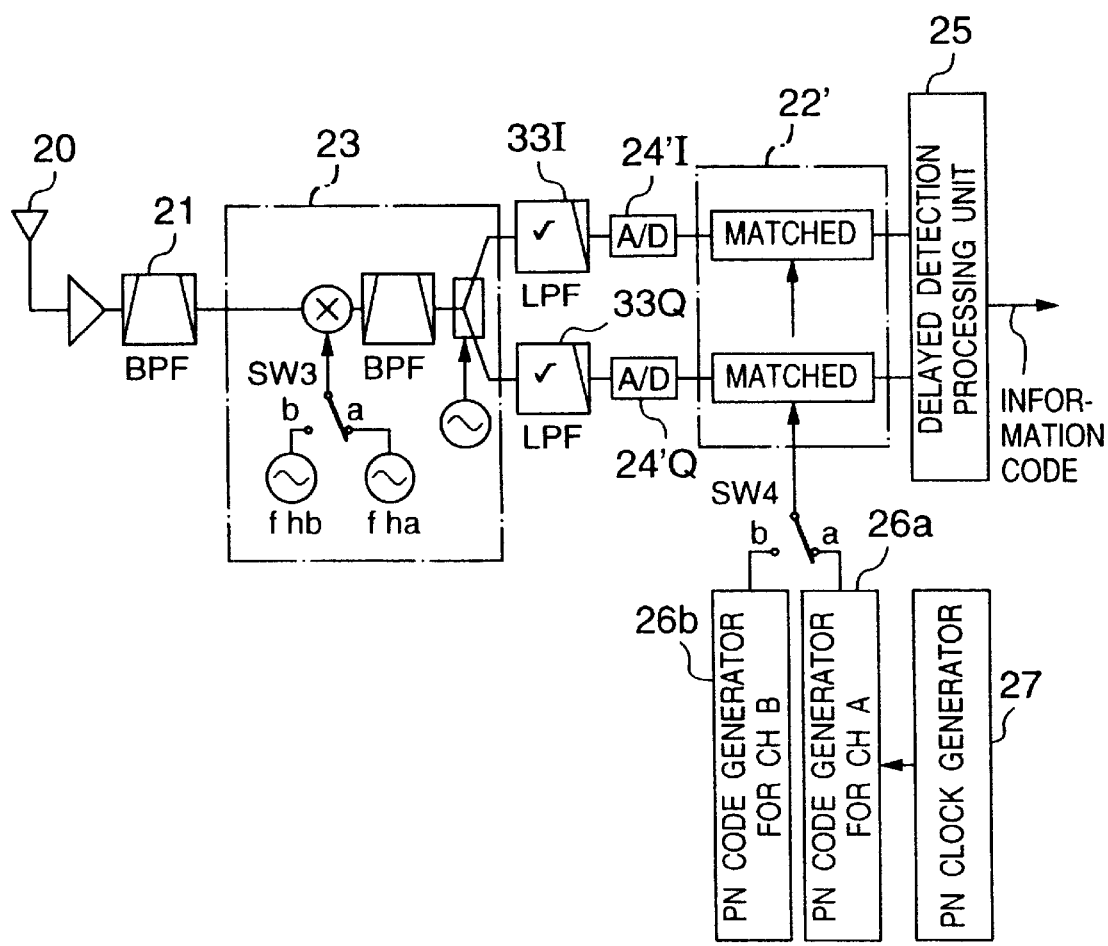
FIG. 2 shows a block diagram of a configuration of a receiver in the transmission apparatus in accordance with the first embodiment of the present invention.

FIG. 1 shows a circuit configuration of a transmitter in a spectrum spread transmission system in accordance with a first embodiment of the present invention and FIG. 2 shows a circuit configuration of a receiver.

Figure 15:
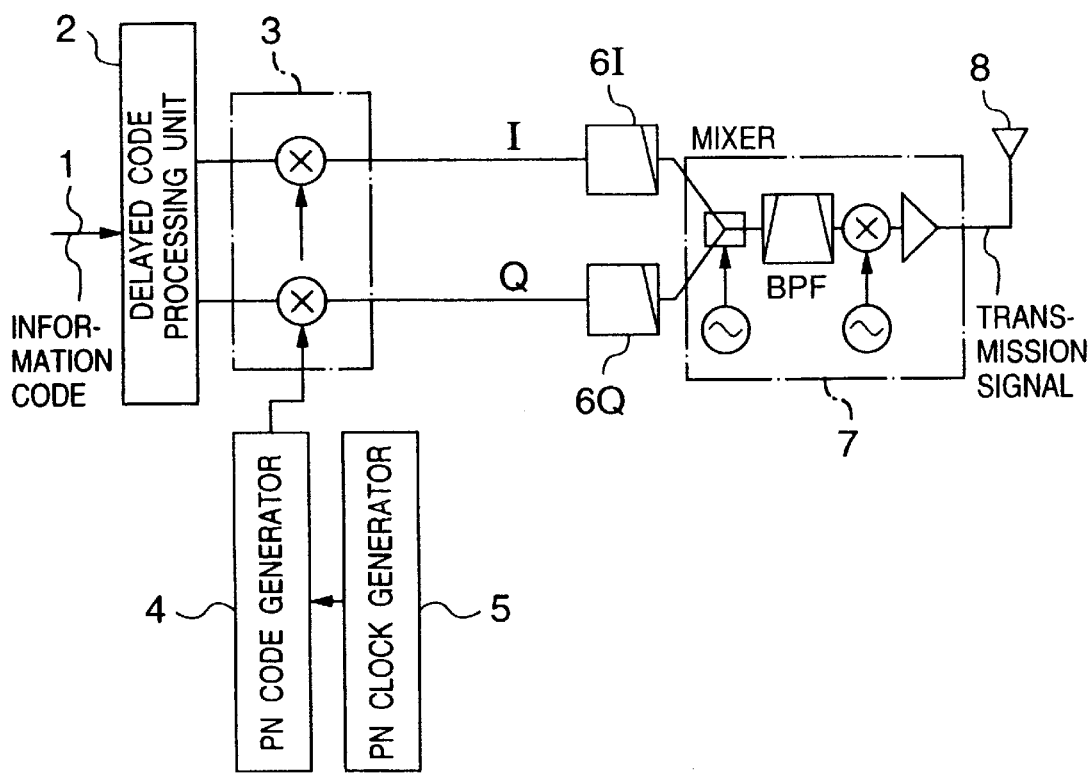
FIG. 15 shows a block diagram of a DQPSK spectrum spread system transmitter.

In the circuit configuration of the transmitter of FIG. 1, a digital filter 30 having a root roll-off filter characteristic corresponding to a chip rate $f_{pna}$ (which is set larger than the chip rate $f_{pna}$ of FIG. 15 circuit to which the transmission method according to the first feature of the invention is applied as will be described later) of a channel A, and a D/A converter 31 for converting the output of the digital filter 30 to an analog signal are newly added between the SS spread unit 3 and the LPF 6 of FIG. 15. The LPF 6 of FIG. 15 is replaced by an LPF 32 having a characteristic to eliminate harmonic components generated by the D/A converter 31.

SW1 and SW2 denote channel selection switches. When both switches SW1 and SW2 are thrown to a contact a, a PN code generator 4a and an oscillator having a frequency $f_{ha}$ are selected and a channel A is selected. When both switches SW1 and SW2 are thrown to a contact b, a PN code generator 4b and an oscillator having a frequency $f_{hb}$ are selected and a channel B is selected.

Figure 16:
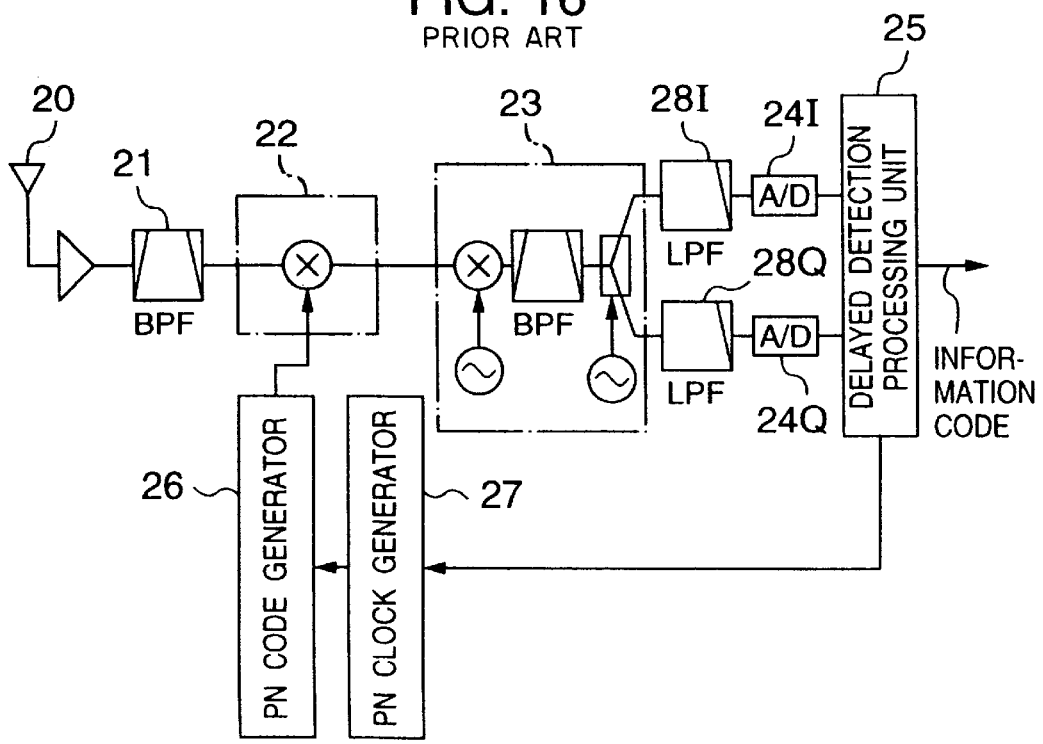
FIG. 16 shows a block diagram of a DQPSK spectrum spread system receiver.

A circuit configuration of a receiver of FIG. 2 is constructed by changing the order of the demodulator 23 and the inverse-spread unit 22 of the circuit of FIG. 16. As a necessary adjustment to the change of order, the SS inverse-spread unit 22 is replaced by an SS inverse-spread unit 22' having an internal circuit comprising a matched filter. On the other hand, the demodulator 23 of FIG. 16 outputs an inverse-spread base band signal. Thus, the LPF 28 and the A/D converter 24 are circuits 33 and 24 which extract the base band component of the information code of 1.5 Mbps and A/D-convert it.

On the other hand, the demodulator 23 of FIG. 2 outputs the spread signal which is spread at the chip rate $f_{pna}$. Thus, in FIG. 2, the A/D converter is replaced by an A/D converter 24' which samples at a frequency higher than double of the frequency $f_{pna}$. The LPF 28 of FIG. 16 is replaced in FIG. 2 by an LPF 33 having a root roll-off characteristic corresponding to the chip rate $f_{pna}$ of the channel A.

In FIG. 2, SW3 and SW4 denote channel selection switches. When both switches SW3 and SW4 are thrown to a contact a, an oscillator having a frequency of $f_{ha}$ and a PN code generator 26a are selected and the channel A is selected. When both switches SW3 and SW4 are thrown to a contact b, an oscillator having a frequency of $f_{hb}$ and a PN code generator 26b are selected and the channel B is selected.

Figure 3A:
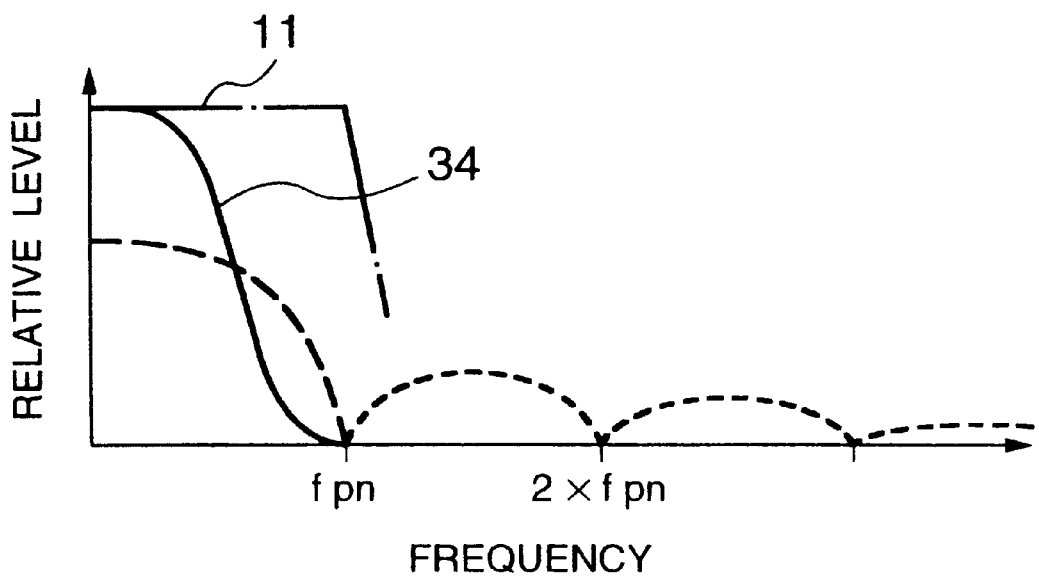
FIGS. 3A and 3B illustrate filter characteristics and functions of the circuit of the first embodiment of the present invention.
Figure 12:
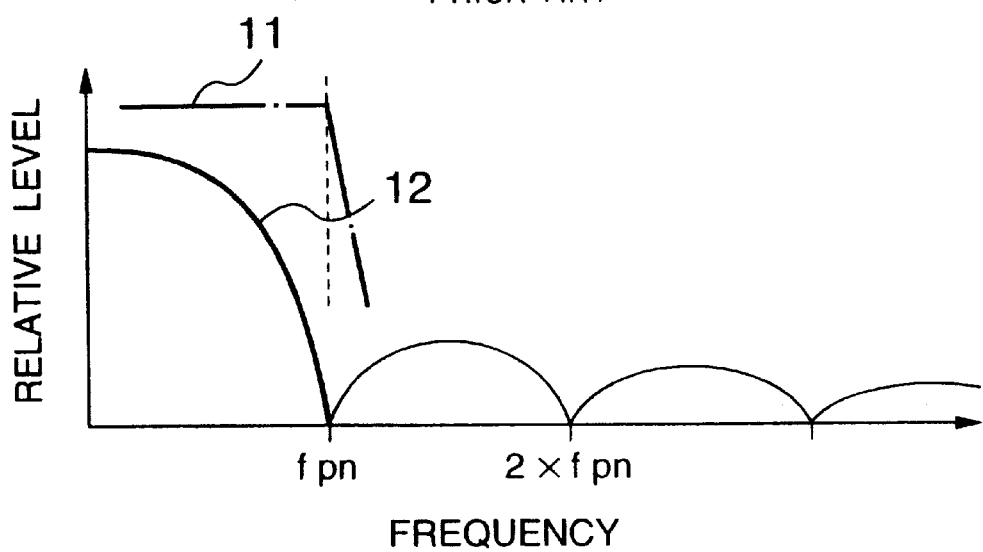
FIG. 12 illustrates filter characteristics and functions of LPF 6 in the transmitter of FIG. 10, FIGS. 13A, 13B, 13C and 13D show frequency distributions of transmission signals for the prior art (FIGS. 13A and 13B) and the present invention (FIGS. 13C and 13D)
Figure 14:
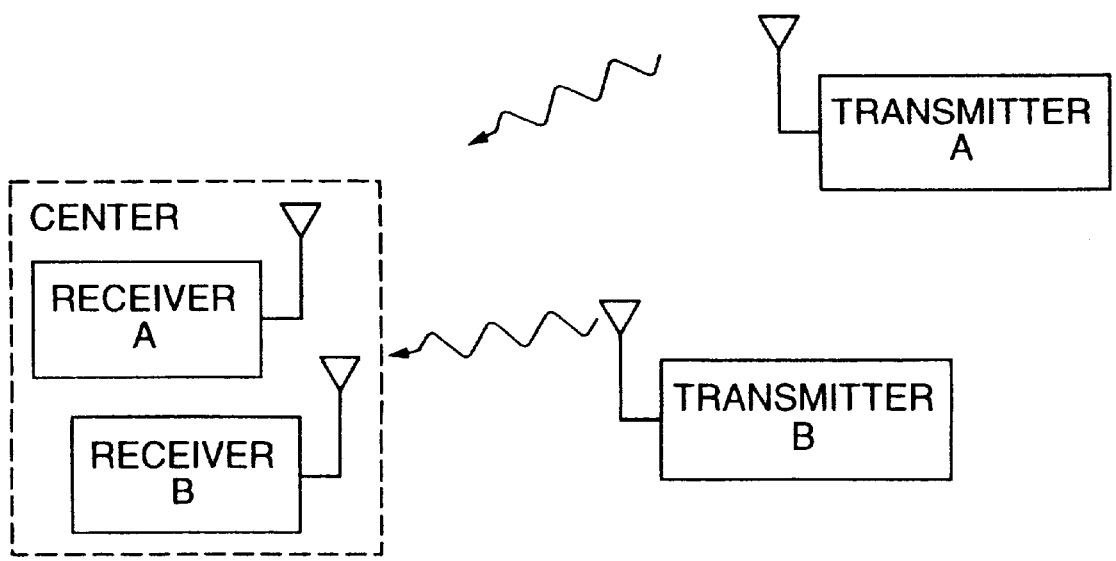
FIG. 14 shows two-channel transmission.

Turning back to FIG. 1, the information code inputted from an input terminal 1 of FIG. 1 is spread by the SS spread unit 3 and applied to the digital filter 30. The digital filter 30 has a root roll-off characteristic (characteristic 34 shown by a solid line in FIG. 3A) for limiting to a narrower frequency band than that by the characteristic of the LPF 6 of FIG. 15 (characteristic 11 shown by a chain line in FIG. 12).

The spread signal limited to the narrower range than the main robe by the digital filter 30 is converted to an analog signal by the D/A converter 31 and it is applied to the LPF 32. The LPF 32 may be any filter which eliminates harmonic components generated by the D/A converter 31 and the LPF 6 of FIG. 15 may be used as it is. Then, like in the circuit of FIG. 15, the QPSK modulation is conducted and the output thereof is transmitted from the antenna 8 by the carrier $f_{ha}$ of the channel A, for example, selected by the channel selection switches SW1 and SW2.

Figure 13A:
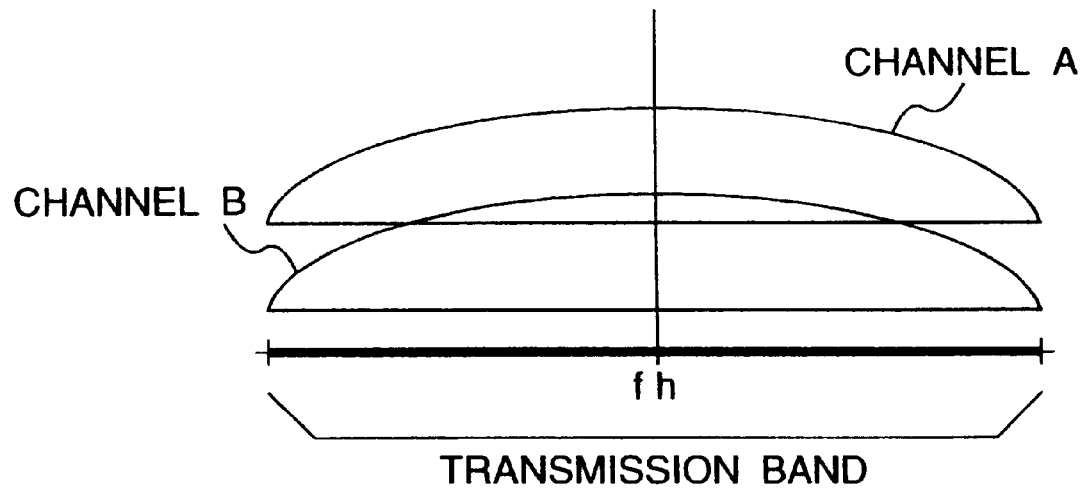
Figure 13B:
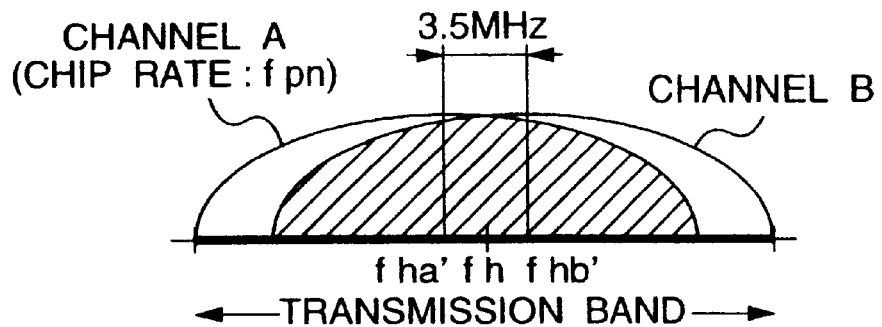
Figure 13C:
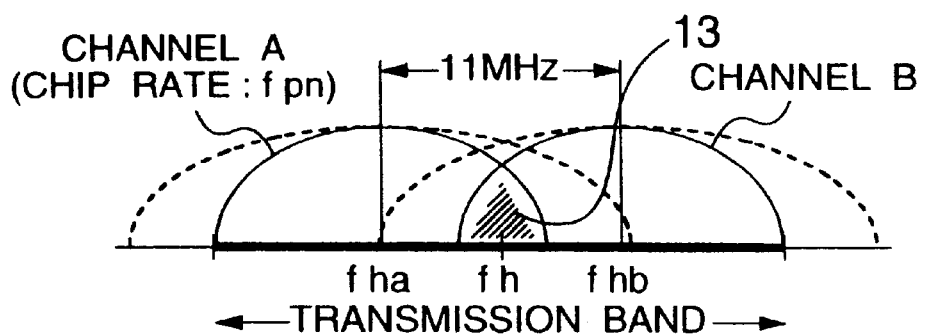
Figure 13D:
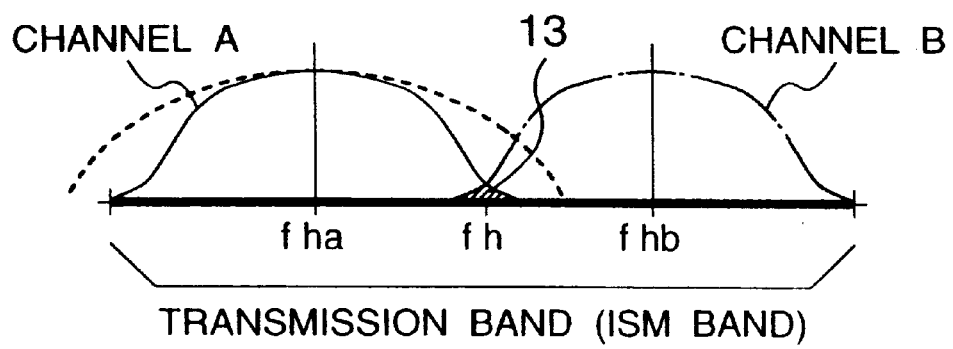

The frequency distribution of the transmission signal of the channel A in the transmission band B is shown in FIG. 13D. A chain line shows the frequency distribution of another channel (channel B having carrier frequency $f_{hb}$ in this example) which simultaneously transmits. A broken line shows a main robe having the band width of $2 \times f_{pna}$ when the frequency limit is not imposed by the digital filter 30. In the transmission apparatus to which the transmission method according to the first feature of the invention is applied, the main robe having the band width of $2 \times f_{pna}$ is transmitted without limitation as shown in FIG. 13B. Thus, the chip rate $f_{pna}'$ is set such that the signal components of the main robe do not spread out of the limit band of the ISM band.

On the other hand, in the present embodiment, the frequency band of the transmission signal is limited to a narrower range than the main robe. Thus, even if the range of the main robe shown by the broken line in FIG. 13D spreads out of the ISM band, the actual signal components shown by the solid line does not spread out of the ISM band. Accordingly, the chip rate $f_{pna}$ which is larger than the chip rate $f_{pns}'$ used in the transmission apparatus of FIG. 15 to which the transmission method according to the first feature of the invention is applied can be used.

As a result, when the information codes are transmitted at the same transmission rate, the transmission may be made by using the PN code having a longer chip length and a larger spread gain than that of the transmission apparatus of FIG.

15 to which the transmission method according to the first feature of the invention is applied (the affect by the noise is less and the transmission of longer distance is attained).

Figure 3B:
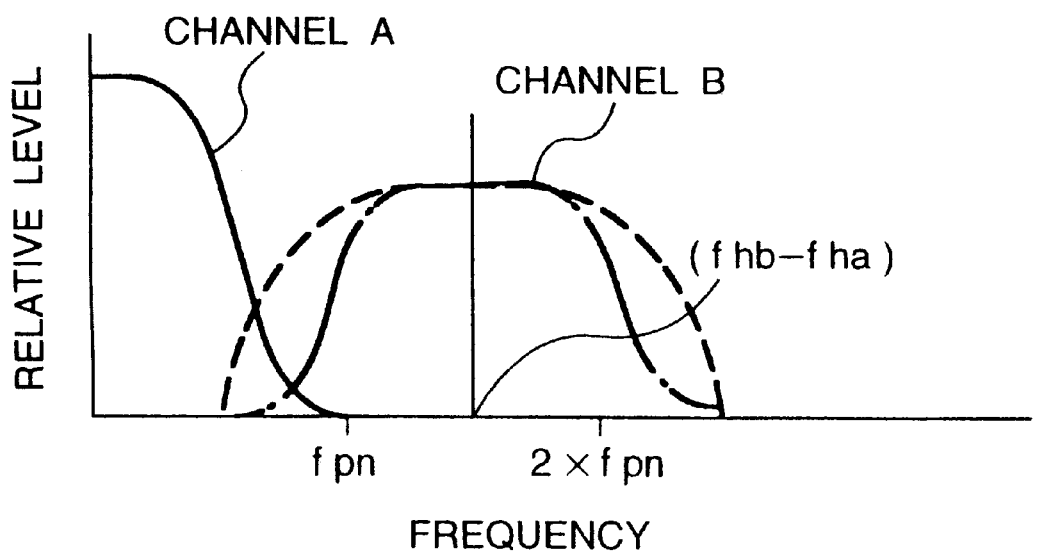

On the other hand, the signal received by the antenna 20 of FIG. 2 is first demodulated into the spread signals of the I component and the Q component of the base band signal by the demodulator 23. FIG. 3B shows the frequency distributions of the demodulated base band signals of the I and Q components. A solid line shows a signal component of the channel A and a chain line shows a signal component of the channel B.

The LPF 33 is a filter having the same root roll-off filter characteristic (characteristic 34 shown by the solid line in FIG. 3A) as that of the digital filter 30 of the transmitter and it is provided to fully eliminate the interference components by the signal of the other channel.

Namely, when the chip rates $f_{pna}$ and $f_{pnb}$ are raised, the bands of the respective signals are widened and the interference components increase. However, since the interference components are reduced by using the LPF 33, the chip rates may be raised to the limit which fits to the amount of reduction. By using the PN code having the longer chip length and the larger spread process gain, the transmission apparatus which is less affected by the noise and can transmit longer distance is attained.

The LPF 33 is provided to reduce the waveform distortion caused by the band limitation by the digital filter 30. In general, when the band is limited, a distortion occurs in the pulse waveform and an eye pattern (window for determining 1 and 0) is closed or narrowed. As a result, the inverse spread performance is deteriorated. However, the characteristic resulting from the two filter characteristics of the digital filter 30 and the LPF 33 of the present embodiment exhibits a roll-off characteristic which is usually used in the digital transmission. Thus, the eye pattern of the demodulated spread signal of the base band is a sufficiently open waveform and when it is inverse-spread by the matched filter, the inverse-spread process without substantial deterioration of the performance such as the decrease of the spread process gain is attained. The signal having the interference components eliminated by the LPF 33 is inverse-spread by the SS inverse-spread unit 22', and it is delay-detected by the delayed detection processing unit 25 and outputted as the information code.

Figure 4:
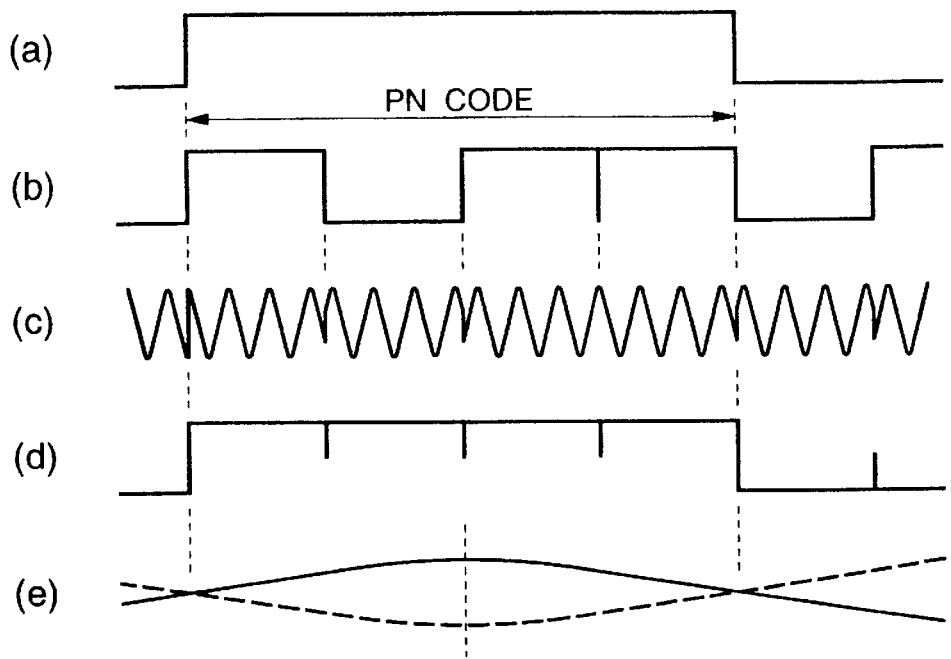
FIG. 4 shows signal waveforms of circuits in a spectrum spread system transmission apparatus shown in FIGS. 15 and 16.

Referring to FIG. 2, the reason for the change of order of the demodulator 23 and the SS inverse-spread unit 22' is explained. For comparison purpose, signal waveforms of circuits of the transmission apparatus of FIGS. 15 and 16 are explained. The spread signal inputted to the modulator 7 of FIG. 15 has a frequency band of the main robe or wider than that. Thus, the waveform of the spread signal inputted to the modulator 7 is generally rectangular as shown in FIG. 4(b). FIG. 4(a) shows a waveform of the information code inputted to the SS spread unit 3. In the modulator 7 of FIG. 15, the pulse of FIG. 4(b) is multiplied by the carrier wave for modulation. FIG. 4(c) shows a waveform of a transmission signal produced in this manner. This waveform has the phase of the carrier inverted to conform to the pulse of FIG. 4(b).

In the receiver of FIG. 16, the received signal having the same waveform as that of FIG. 4(c) is multiplied by the PN code to recover the phase of the inverted carrier. Then, it is multiplied by the reference carrier signal by the demodulator 23 to demodulate the base band signal of FIG. 4(d). The band limit to the frequency band corresponding to the transmission rate $f_b$ of the information code is made by the LPF 28 and the values shown by the longitudinal broken line are sampled from the signal waveform of FIG. 4(e) free from the noise component to demodulate the information signal.

Figure 5:
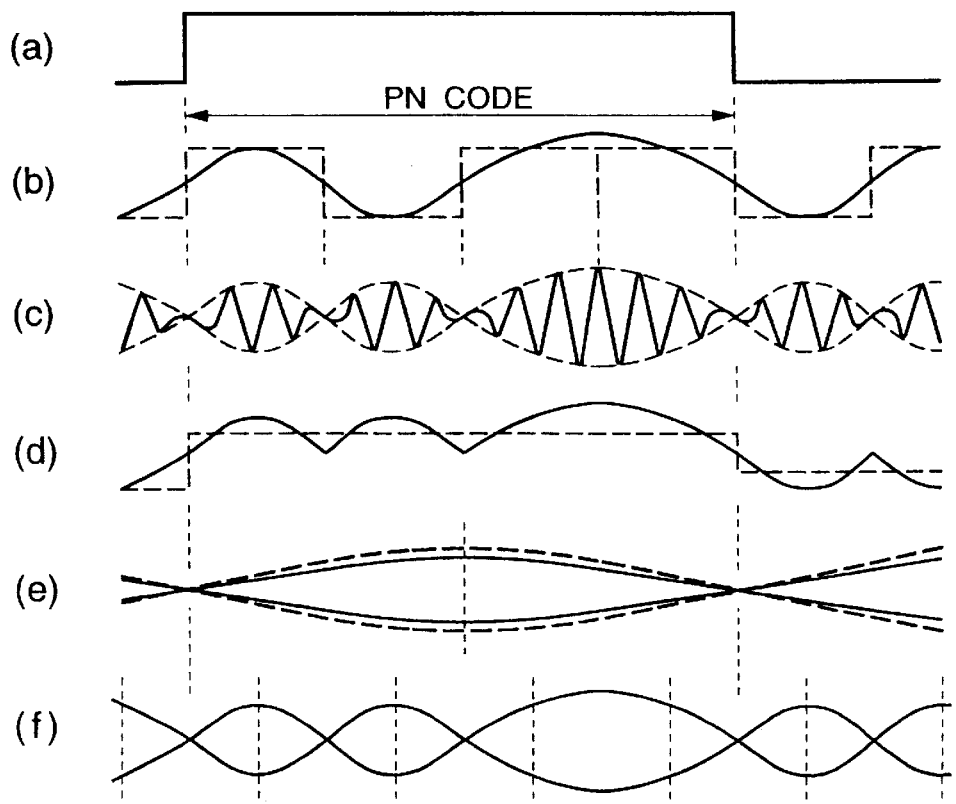
FIG. 5 shows signal waveforms of circuits in the transmission apparatus in accordance with the first embodiment of the present invention.

When the spread signal is limited to the band narrower than the main robe as it is in the circuit of FIG. 1, the waveform of the spread signal is a dull waveform close to a sine wave as shown by a solid line in FIG. 5(b). Thus, the transmission signal modulated by the modulator 7 is a waveform having a large amplitude change (signal corresponding to FIG. 4(c)) as shown in FIG. 5(c). FIG. 5(a) shows the same waveform of the information code as that of FIG. 4(a). When this transmission signal is first inverse-spread and then demodulated in accordance with the circuit of FIG. 16, the demodulated base band signal waveform repeats the change of the amplitude as shown in FIG. 5(d) (signal corresponding to FIG. 4(d)) and a mean level thereof is lowered. Thus, the signal waveform having the noise component eliminated by the LPF 28 has a smaller amplitude than the waveform of FIG. 4(e) (shown by the broken line in FIG. 5(e)) as shown by the solid line in FIG. 5(e) and the S/N ratio is lowered. Accordingly, the expected spread gain is not attained and the transmission distance is shortened.

On the other hand, in the receiver of FIG. 2 in accordance with the present embodiment, it is first demodulated and then inverse-spread. Namely, the transmission signal of FIG. 5(c) is first passed through the demodulator 23 and the LPF 33 to demodulate the base band signal shown in FIG. 5(f). Then, the values shown by the broken line are sampled from the signal waveform of FIG. 5(f) to inverse-spread it to obtain the information code. By matching the characteristics of the digital filter 30 of FIG. 1 and the LPF 33 of FIG. 2, the roll-off filter characteristic well known in the digital communication is attained and the value at the broken line point of FIG. 5(f) (aperture of the eye pattern) is substantially equal to that attained when the band limitation to narrower than the main robe is not conducted, and the expected spread gain is attained. By increasing the chip rate by the amount corresponding to the decrease of the interference noise and using the PN code having the longer chip length, the transmission distance can be extended.

In the transmitter of the spectrum spread system transmission apparatus of the present embodiment, the band of the transmission signal is limited narrower than the main robe. Even if the chip rate $f_{pna}$ which is larger than the chip rate $f_{pna}'$ used in the transmission apparatus of FIG. 15 to which the transmission method according to the first feature of the invention is applied, is used, the actual signal components do not spread out of the ISM band. Thus, when the information code is transmitted at the same transmission rate, the transmission may be made by using the PN code having the longer chip length and the larger spread gain than those of the transmission apparatus of FIG. 15 to which the transmission method according to the first feature of the invention is applied. As a result, the effect of the noise is less susceptible and the transmission of longer distance is attained.

Since the interference components of the other channel are fully eliminated by the LPF 33 of the receiver, the chip rate can be raised to the limit which conforms to the amount of reduction, and by using the PN code having the longer chip length, the transmission apparatus which is less affected by the noise and can transmit over a longer distance is attained. The performance of the spread gain is not substantially deteriorated even if the band limit is made by the digital filter 30 and the LPF 33.

By the collective effect, the relation between the maximum transmission distance and the transmission rate, for example, the difference between maximum transmission distances for the one channel transmission and the two channel simultaneous transmission when the information code of 1.5 Mbps is transmitted by using the 10-chip PN code, is significantly improved.

Figure 17:
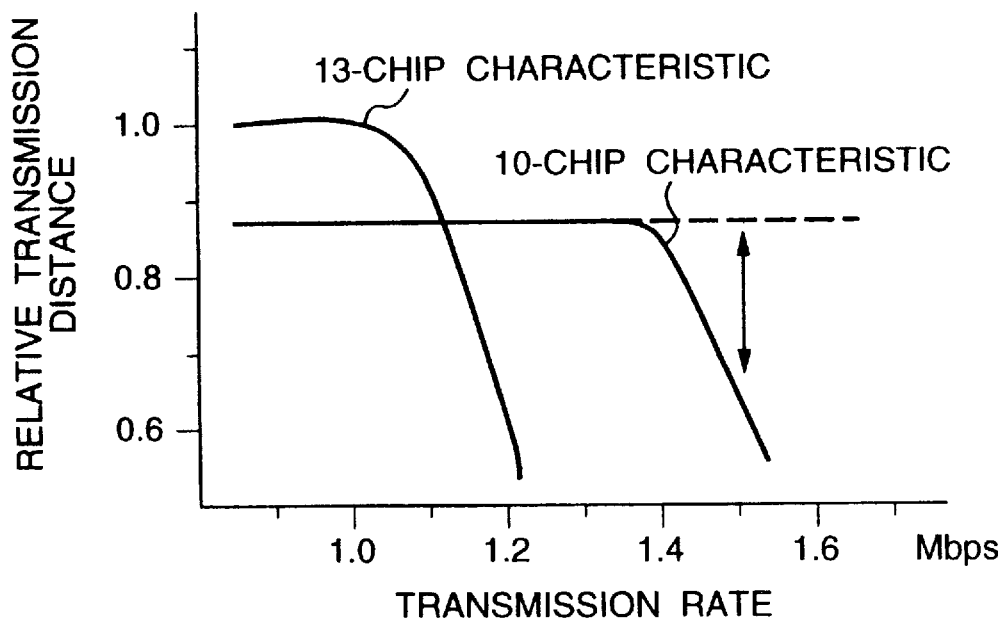
FIG. 17 shows a relation between a maximum transmission distance and a transmission rate by the transmission system in accordance with the first feature of the present invention.
Figure 18:
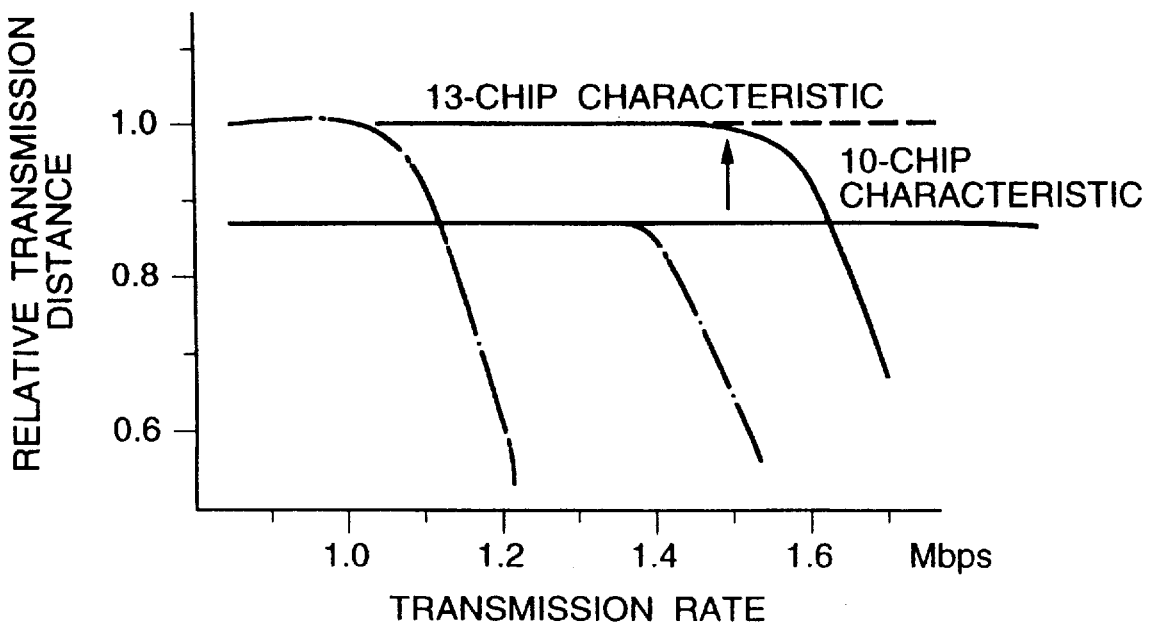
FIG. 18 shows a relation between the maximum transmission distance and the transmission rate by the transmission system in accordance with the third feature of the present invention.

Thus, in the position setting of the movable station and the initial adjustment, the complicated linkage of the adjustment of the transmission power and the adjustment of the transmission distance and the resulting complication of the determination of the setting position of the movable station and the initial adjustment of the transmission power are avoided and the transmission apparatus which is convenient to use is attained. Even if the 13-chip PN code which can extend the maximum transmission distance (in the method of FIG. 17, the information code of 1.5 Mbps cannot be transmitted) is used, the difference between maximum transmission distances for one channel transmission and the two channel simultaneous transmission is small and the transmission apparatus which is relatively easy for initial adjustment and convenient to use is attained. In this case, since the chip length is increased from 10 chips to 13 chips, the maximum transmission distance may be further extended.

In the first embodiment, the filter for limiting the band in the transmitter is implemented by the digital filter 30, and the filter for limiting the band in the receiver is implemented by the LPF 33 which is the analog filter. Alternatively, both filters for limiting the bands in the transmitter and the receiver may be implemented by the digital filters, both filters for limiting the bands in the transmitter and the receiver may be implemented by the analog filters, or the filter for limiting the band in the transmitter may be implemented by the analog filter and the filter for limiting the band in the receiver may be implemented by the digital filter as opposed to the first embodiment. The digital filter requires a number of multiplication circuits and the circuit scale tends to increase. In the receiver, the simplification of the operation is difficult to attain because the signal level varies and high speed operation elements and a large circuit scale are needed. Nevertheless, it is preferable to use the digital filter in view of the stability for the temperature characteristic, the manufacturing variation and the flatness of the group delay characteristic.

Figure 6:
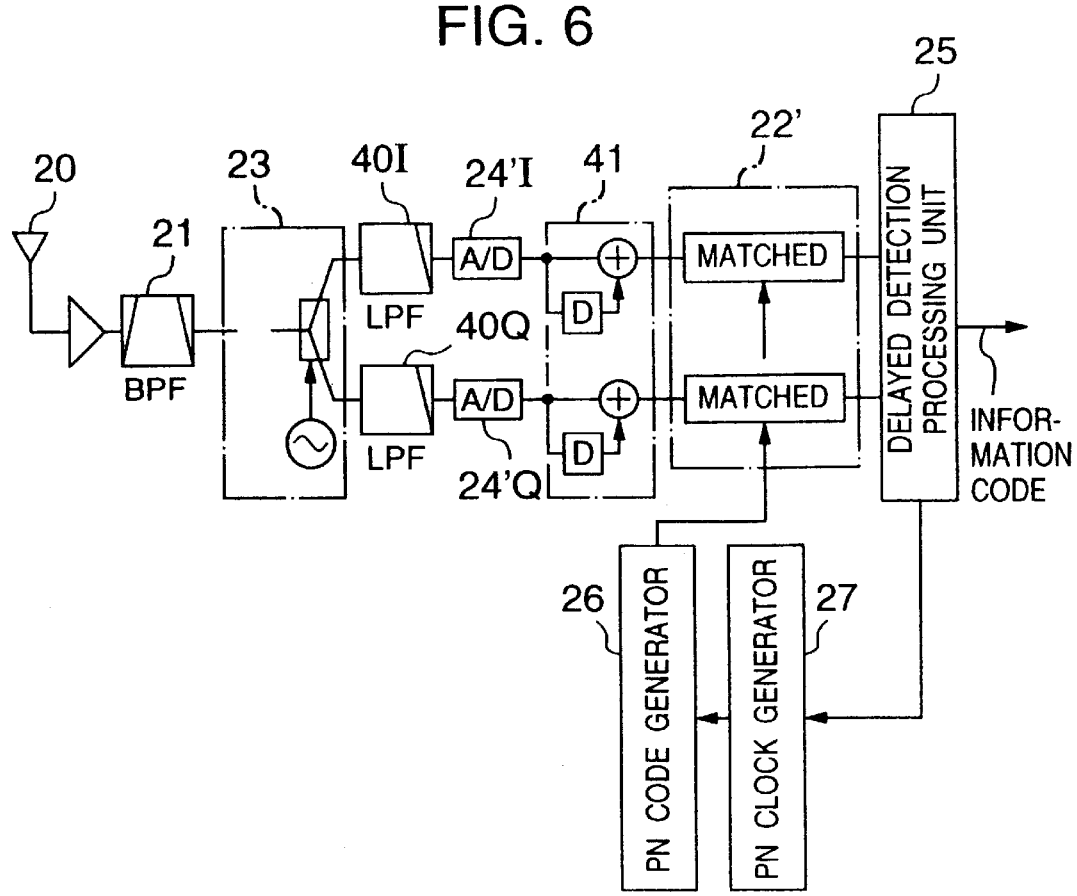
FIG. 6 shows a block diagram of a configuration of a receiver in the transmission apparatus in accordance with a second embodiment of the present invention.

FIG. 6 shows a circuit configuration of a receiver in the spectrum spread system transmission apparatus in accordance with a second embodiment of the present invention. The same transmitter as that of FIG. 1 is used.

The circuit configuration of the receiver of FIG. 6 is basically identical to the circuit configuration of FIG. 2 except that the frequency characteristic similar to the root roll-off filter characteristic of the LPF 33 of FIG. 2 is implemented by two filters. Of those, the first filter is a low pass filter LPF 40 which eliminates the frequency components having the frequencies not less than $f_{pna}$, of the PN code in the base band signal. The second filter is a two-tap digital filter 41 which sums the base band signal itself and a signal derived by delaying the base band signal by one half period (T/2) of the pulse period T ($1/f_{pna}$) of the PN signal.

Figure 7:
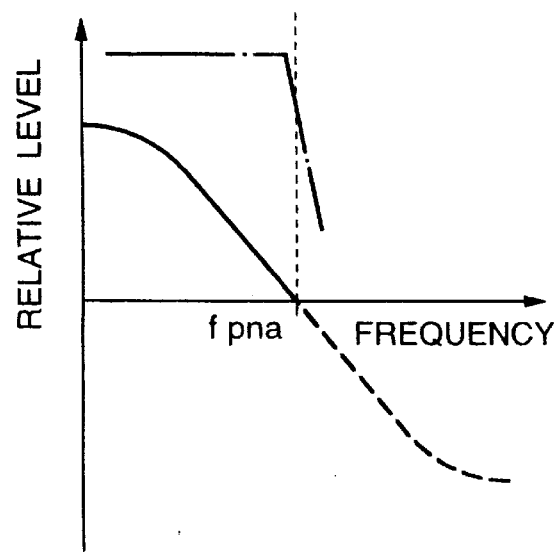
FIG. 7 illustrates filter characteristics and functions of circuits of the second embodiment of the present invention.

The digital filter 41 has a frequency characteristic represented by a cosine function shown by a solid line and a broken line in FIG. 7, and it crosses 0 at a point of frequency $f_{pna}$. On the other hand, the LPF 40 has a characteristic which is relatively sharp and exhibits a flat group delay characteristic so that only a substantially main robe is passed as shown by a chain line in FIG. 7. The 3 dB down cut-off frequency of the LPF 40 may be somewhat lower than the frequency $f_{pna}$. A combined characteristic of the two filters is shown by a solid line in FIG. 7, which is close to the root roll-off characteristic. Since the combined characteristic is somewhat different from the root roll-off characteristic, the effect thereof is somewhat less. For example, when the chip length is 13 chips, the difference between maximum transmission distances for the one channel transmission and the two channel simultaneous transmission somewhat increases. However, the difference decreases from approximately 22% in the 10-chip length of FIG. 17 to approximately 7%, which is smaller than 10% in spite of the use of the 13-chip PN code. Thus, so long as it is not used in the vicinity of the maximum transmission distance, the initial adjustment is not extremely complicated and the maximum transmission distance in the one channel transmission can be extended to approximately 1.15 times of that for the 10 chips of FIG. 17 while maintaining the usability within the permissible range. Namely, in the present embodiment, since the combined filter characteristic is close to the root roll-off characteristic, basically the same effect as that of the first embodiment is achieved.

As described in the last paragraph for the first embodiment, it is preferable to implement the filter for limiting the band by the digital filter. However, when the root roll-off characteristic which requires the operation of not less than 15 taps with the 8-bit precision is to be implemented by only the digital filter, the circuit scale increase with the present technologies.

The digital filter 41 used in the present embodiment is the two-tap filter and can be implemented with a relatively small circuit scale. The LPF 40 which have an auxiliary function need only has a flat group characteristic and a predetermined sharpness in the main robe and it may be implemented relatively easily. The combined root-roll-off characteristic is substantially determined by the digital filter 41 and the stability of the characteristic is attained as it is when the root roll-off characteristic is implemented by the single digital filter.

In this manner, in the receiver of the spectrum spread system transmission apparatus of the present embodiment, the substantially same effect as that of the first embodiment is achieved and the circuit having the stable filter characteristic is provided as it is when the band limiting filter is implemented by the single digital filter, without significantly increasing the circuit scale of the receiver.

Figure 8:
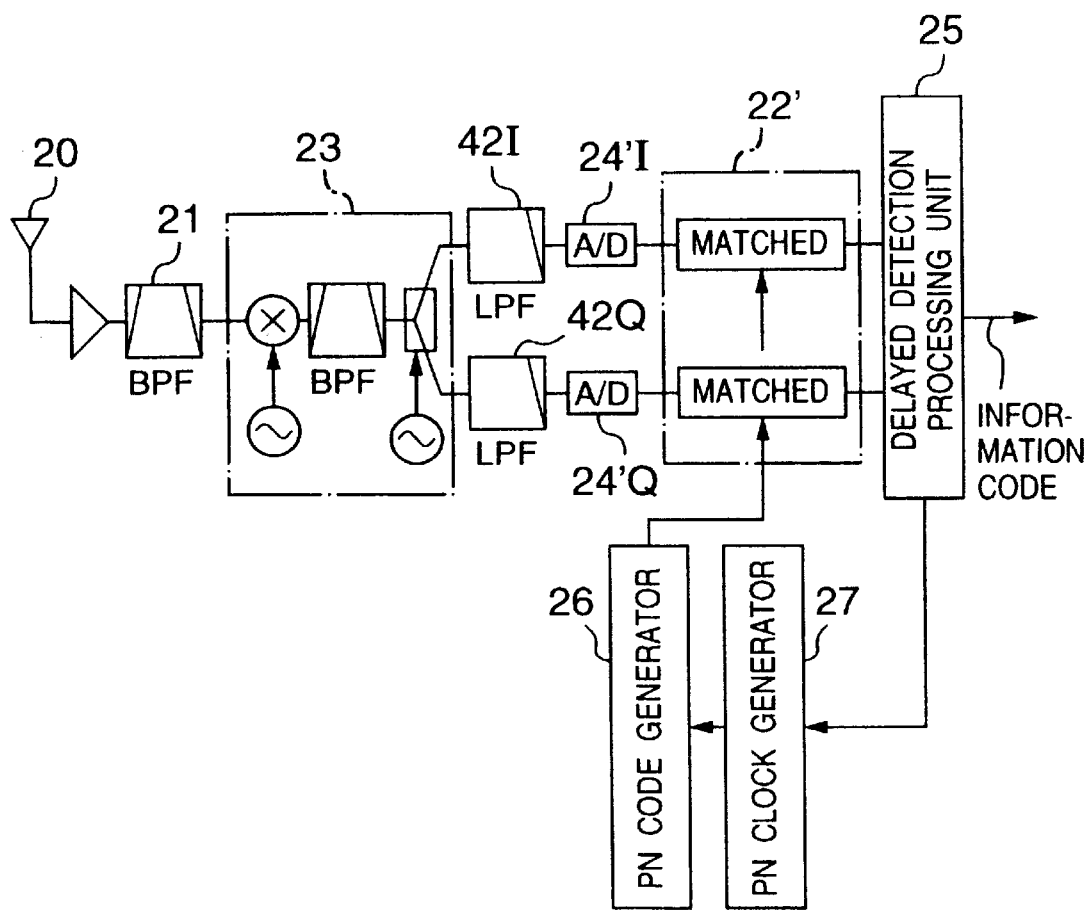
FIG. 8 shows a block diagram of a configuration of a receiver in the transmission apparatus in accordance with a third embodiment of the present invention.

FIG. 8 shows a circuit configuration of a receiver in the spectrum spread system transmission apparatus in accordance with a third embodiment of the present invention. The transmitter for transmitting the main robe as shown in FIG. 15 is used as a transmitter.

The circuit configuration of the receiver of FIG. 8 is basically identical to the circuit configuration of FIG. 2 except that the LPF 33 having the root roll-off characteristic shown in FIG. 2 is replaced by an LPF 42 having a roll-off filter characteristic.

Figure 9:
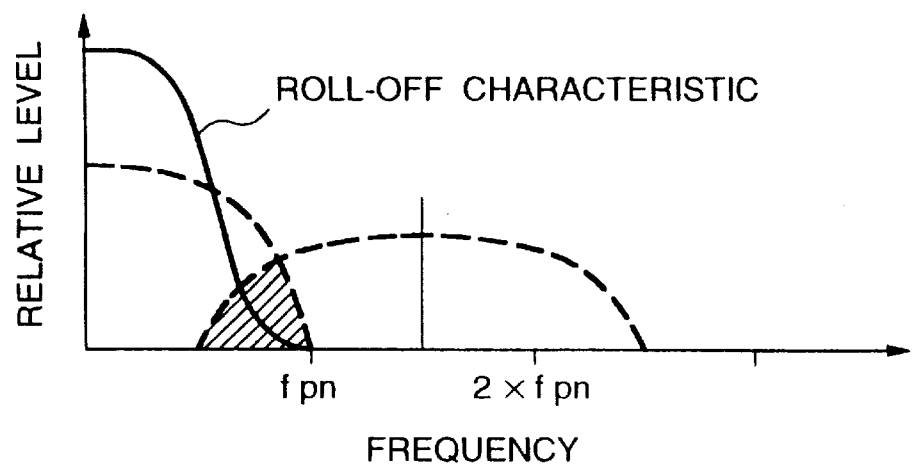
FIG. 9 illustrates filter characteristics and functions of circuits in the third embodiment of the present invention.
Figure 10:
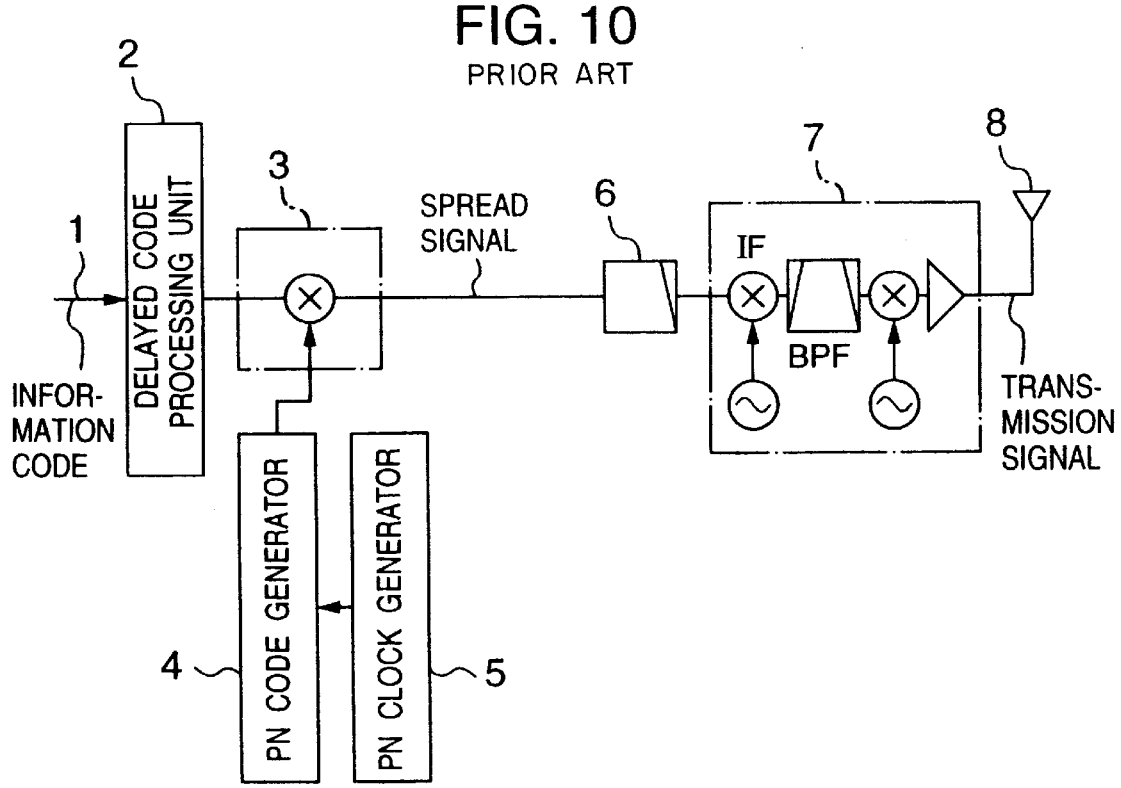
FIG. 10 shows a block diagram of a configuration of a prior art spectrum spread system transmitter.
Figure 11:
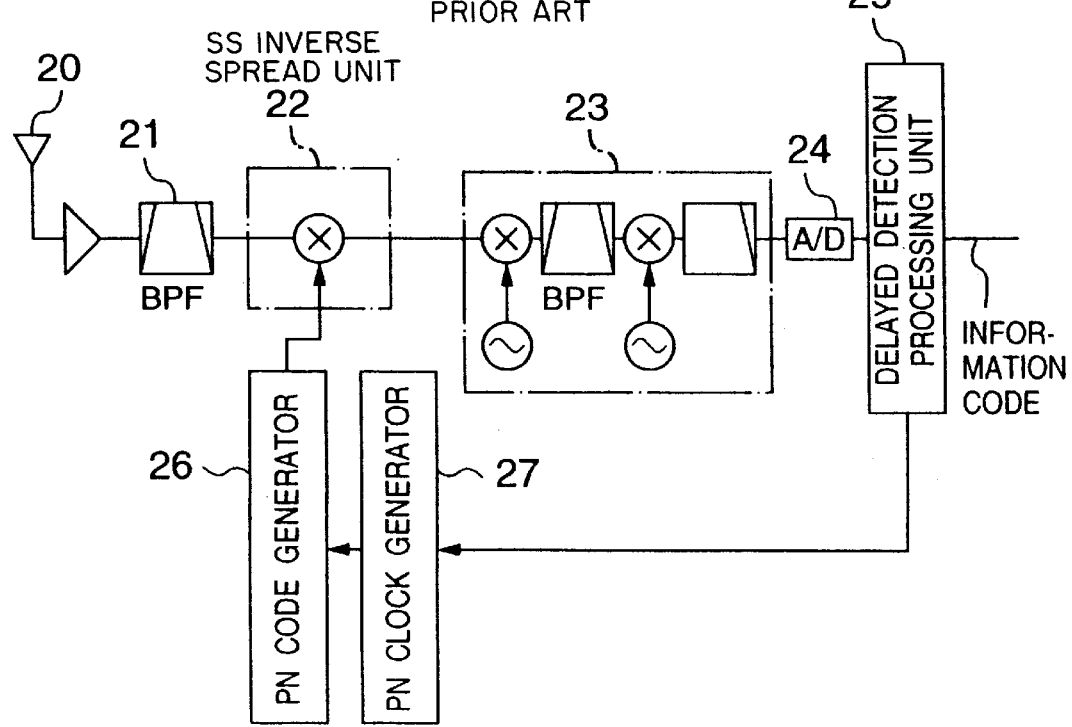
FIG. 11 shows a block diagram of a configuration of a prior art spectrum spread system receiver.

The transmission signal outputted from the transmitter comprises the main robe components as shown in FIG. 13B and the interference components from other channel, as shown by hatching in FIG. 9, are present in the base band signal demodulated by the demodulator 23 of FIG. 8. However, in the receiver of FIG. 8, the band limitation is conducted by the LPF 42 having the roll-off characteristic shown by a solid line in FIG. 9 and then the inverse spreading is conducted to reproduce the information code. Thus, as seen from FIG. 9, the interference components from other channel can be reduced.

As a result, by the same reason for the first object of the LPF 33 described in the first embodiment, the PN code having the long chip length and the large spread gain may be used to provide the transmission apparatus which is less affected by the noise and can over a longer distance.

Further, since the LPF 42 has the roll-off characteristic which is normally used in the digital transmission, the eye pattern of the spread signal of the demodulated base band signal is of a sufficiently opened waveform. Thus, the inverse-spread process without substantial deterioration of the performance such as the reduction of the spread gain is attained and the same effect as that of the first embodiment is achieved.

Namely, the difference between maximum transmission distances for the one channel transmission and the two channel simultaneous transmission is improved. In the position setting of the movable station and the initial adjustment, the complicated linkage of the adjustment of the transmission power and the adjustment of the transmission distance and the resulting complication of the determination of the setting position of the movable station and the initial adjustment of the transmission power are avoided and the transmission apparatus which is convenient to use is provided. Further, since the PN code having the long chip length which can extend the maximum transmission distance is used, the transmission over a longer distance is attained.

The digital circuit requires a number of multiplication circuits and the circuit scale tends to increase. In the receiver, it is difficult to simplify the operation because the signal level varies, and high speed operation elements and a large circuit scale are needed. Nevertheless, the use of the digital filter as the LPF 42 is preferable in view of the stability of the temperature characteristic, the manufacturing variation and the flatness of the group delay characteristic. In this case, the LPF 42 is arranged succeeding to the A/D converter 24'.

Instead of using the LPF 42, the BPF 21 or the BPF in the demodulator 23 may be provided with the same characteristic as that of the LPF 42.

In this manner, in the transmitter of the spectrum spread system transmission apparatus of the present embodiment, a similar effect to that of the first embodiment is achieved although the degree of effect is smaller than that of the first embodiment.

While the above embodiments describe the two channel simultaneous transmission, it is apparent that the same effect may be achieved for more than two channel simultaneous transmissions.

In the above description for the spectrum spread system transmission apparatus which uses both the DQPSK system and the SS system, the transmission rate is assumed to not be less than 1.3 Mbps. However, it is apparent that the same effect may be achieved for the transmission apparatus which uses both the DBPSK system and the SS system and for the transmission rate of 1.0 Mbps to 1.3 Mbps which is necessary for the transmission of the motion pictures or semi-motion pictures, or a lower transmission rate.

In the US, the ISM band is prescribed as follows:
902 MHz–928 MHz (26 MHz width)
1.4 GHz–2.483 GHz (83 MHz width)
5.725 GHz–5.859 GHz (134 MHz width)

In the present specification, the ISM band (26 MHz) for Japan has been described. When a signal at a transmission rate of approximately 2 Mbps is to be transmitted with the US frequency band of 134 MHz, the 63-chip spread code may be used. When the spread code of long code length such as 63 chips is used, the two channel simultaneous transmission may be attained even with the prior art spread system. However, by using the present invention, the spread code of longer code length may be used and the apparatus is less affected by the noise and the transmission over a longer distance than that attained by the prior art apparatus is attained for the two channel simultaneous transmission. When the spread code of the same code length as that of the prior art apparatus is used, the transmission rate of each channel in the simultaneous transmission may be higher in the present invention than that of the prior art.

While the transmission through the ISM band has been described, it is apparent that the same effect may be achieved when a predetermined transmission band having the bandwidth limited is used.

In the above description, it is assumed that the error correction code is not used. It is apparent that the same effect may be achieved when the error correction code is used with the change of only the target code error of $1/10^8$.

In the spectrum spread system transmission apparatus of the present invention, the two channel simultaneous transmission at the transmission rate of 1.5 Mbps which is necessary for the transmission of the motion pictures or the semi-motion pictures through the ISM band having the bandwidth of 26 MHz. Further, the difference between maximum transmission distances for the one channel transmission and the two channel simultaneous transmission is significantly improved. Thus, in the position setting of the movable station and the initial adjustment, the complicated linkage of the adjustment of the transmission power and the adjustment of the transmission distance and the resulting complication of the determination of the setting position of the movable station and the initial adjustment of the transmission power are avoided and the transmission apparatus which is convenient to use is provided.

When the information code is transmitted at the same transmission rate, the transmission may be made by using the PN code which has the longer chip length and the larger spread gain than those of the prior art transmission apparatus. As a result, the apparatus is less affected by the noise and the transmission over the longer distance is attained. The above effects are not limited to the spectrum spread system transmission apparatus which uses both the DQPSK system and the SS system but the same effect may be achieved for the spectrum spread transmission apparatus which uses both the DBPSK system and the SS system and for the transmission rate of not lower than 1.0 Mbps necessary for the transmission of the motion pictures or the semi-motion pictures, or the lower transmission rate used in the transmission of the normal information code. Further, the above effects are not limited to the ISM band but the same effects may be achieved for any transmission band having the bandwidth limited.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A spectrum spread system transmission apparatus using a binary phase shift keying (BPSK) system or a quadrature phase shift keying (QPSK) system and a spectrum spread system by direct spread modulation, wherein two or more channels are provided by using a spread code having the number of repetition bits (chip length) smaller than a longest channel code permitted by a predetermined transmission band and a predetermined transmission rate, and carrier frequencies of the channels are set to different values from each other, said transmission apparatus comprising:

(a) a receiver including:
a receiving antenna,
a BPSK or QPSK demodulator for each channel, connected to said receiving antenna, and
a spectrum inverse-spread circuit for each channel, receiving a base band signal from said BPSK or QPSK demodulator;

(b) a transmitter including:
a spectrum spread circuit for each channel, receiving an information code,
a BPSK or QPSK modulator for each channel, receiving said spread code signal of the base band from said spectrum spread circuit, and
a transmitting antenna connected to said BPSK or QPSK modulator; and (c) a frequency characteristic control circuit inserted at a point between said spectrum spread circuit for each channel of said transmitter and said transmitting antenna and a point between said receiving antenna and said spectrum inverse-spread circuit for each channel of said receiver, for limiting bands of frequency characteristics of corresponding channels to ranges narrower than a main robe band determined by chip rates of the spread code of the corresponding channels, wherein said frequency characteristic control circuit inserted between said spectrum spread circuit for each channel and said transmitting antenna of said transmitter is a root roll-off filter, and said frequency characteristic control circuit inserted between said receiving antenna and said spectrum inverse-spread circuit for each channel of said receiver comprises a first filter having two taps for summing the demodulated base band signal and a signal delayed from the base band signal by one half period of a pulse period of the spread signal, and a second filter for eliminating frequency components having frequencies higher than the frequency of the spread signal in the base band signal.

2. A spectrum spread system transmission apparatus according to claim 1, wherein a 2.4 GHz small power communication band is used for the transmission band used for the transmission, and the transmission rate of information code transmitted on at least one channel of said two or more channels transmitted through the predetermined transmission band is set to not less than 1 Mbps.

3. In a spectrum spread system transmission apparatus using a binary phase shift keying (BPSK) system or a quadrature phase shift keying (OPSK) system and a spectrum spread system by direct spread modulation, wherein two or more channels are provided and carrier frequencies of the channels are set to different values from each other, a spectrum spread system transmission method used for the transmission apparatus comprising the steps of:

(a) in a transmitter during a transmission mode:
spectrum-spread-modulating an information code by a spectrum spread circuit for each channel to generate a spread code signal of a base band,
modulating the spread code signal of the base band for each channel by a BPSK or OPSK modulator, and
transmitting an output of the BPSK or OPSK modulator from a transmitting antenna;

(b) in a receiver during a receive mode:
demodulating the signal received by a received by a receiving antenna for each channel by a BPSK or OPSK demodulator to generate a base band signal, and
demodulating the base band signal for each channel by a spectrum inverse-spread circuit to produce the information code; and (c) limiting bands of frequency characteristics of the corresponding channels to ranges narrower than a main robe band determined by chip rates of spread codes of corresponding channels by a frequency characteristic control circuit inserted at a point between said spectrum spread circuit for each channel of said transmitter and said transmitting antenna and a point between said receiving antenna and said spectrum inverse-spread circuit for each channel of said receiver, wherein said frequency characteristic control circuit inserted between said spectrum spread circuit for each channel and said transmitting antenna of said transmitter is a root roll-off filter, and said frequency characteristic control circuit inserted between said receiving antenna and said spectrum inverse-spread circuit for each channel of said receiver comprises a first filter having two taps for summing the demodulated base band signal and a signal delayed from the base band signal by one half period of a pulse period of the spread code signal, and a second filter for eliminating frequency components having frequencies higher than the frequency of the spread signal in the base band signal.

* * * * *